United States Patent
Yeh et al.

(10) Patent No.: US 8,066,388 B2
(45) Date of Patent: Nov. 29, 2011

(54) LIGHT SOURCE DEVICE AND PROJECTOR HAVING SAME

(75) Inventors: Hsin-Tsung Yeh, Taipei Hsien (TW); Chun-Hsiang Huang, Taipei Hsien (TW); Wei-Hsiu Chang, Taipei Hsien (TW); Kuang-Wei Lin, Taipei Hsien (TW); Kuan-Ting Chen, Taipei Hsien (TW); Mei-Chun Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 462 days.

(21) Appl. No.: 12/417,614

(22) Filed: Apr. 2, 2009

(65) Prior Publication Data

US 2010/0097578 A1 Apr. 22, 2010

(30) Foreign Application Priority Data

Oct. 20, 2008 (CN) .......................... 2008 1 0305018

(51) Int. Cl.
*G03B 21/26* (2006.01)
*G03B 21/28* (2006.01)
*G03B 21/14* (2006.01)
*F21V 13/00* (2006.01)
*F21V 7/00* (2006.01)
*G02B 5/10* (2006.01)
*H04N 5/74* (2006.01)

(52) U.S. Cl. ............... 353/94; 353/99; 353/81; 353/84; 348/771; 359/868; 362/241; 362/243; 362/247; 362/297; 362/301; 362/341

(58) Field of Classification Search ................... 353/94, 353/98–99, 81, 84; 348/771; 359/868; 362/241, 362/243, 247, 297, 301, 341
See application file for complete search history.

(56) References Cited

U.S. PATENT DOCUMENTS

| 6,488,379 B2 * | 12/2002 | Kane ............................ 353/94 |
| 6,505,939 B1 * | 1/2003 | Bierhuizen et al. ............ 353/94 |
| 7,738,177 B2 * | 6/2010 | Moss ............................ 359/638 |
| 7,784,950 B2 * | 8/2010 | Sawai ........................... 353/97 |

* cited by examiner

*Primary Examiner* — Georgia Y Epps
*Assistant Examiner* — Magda Cruz
(74) *Attorney, Agent, or Firm* — Altis Law Group, Inc.

(57) ABSTRACT

A light source device includes a first light source, a second light source, a reflective assembly, and a condensing lens defining an optical axis. The first light source includes a first lamp and a first reflector reflecting light beams generated by the first lamp as first parallel light beams. The second light source includes a second lamp and a second reflector reflecting light beams generated by the second lamp. The first light source, the reflective assembly and the condensing lens are arranged in order along the optical axis. The second light source corresponds to the reflective assembly deviated from the optical axis. The reflective assembly reflects light beams reflected by the first reflector back to the first reflector, and reflects light beams from the second reflector to the condensing lens. The condensing lens condenses the first parallel light beams and the light beams reflected by the reflective assembly.

20 Claims, 4 Drawing Sheets

LIGHT SOURCE DEVICE AND PROJECTOR HAVING SAME

BACKGROUND

1. Technical Field

The disclosure relates to projection technology and, particularly, to a light source device and a projector having the same.

2. Description of the Related Art

Light source devices, such as high pressure mercury lamps, metal halide lamps, or xenon lamps, used in projectors are configured for generating white light beams and, in cooperation with a digital micro-mirror device (DMD) and a color wheel, to project a color image. To obtain a projected image with high brightness, it is required to increase the power of the light source devices. However, when a projector is constructed using a single light source device, the brightness of the projected image is limited.

Therefore, what is needed is a light source device and a projector using the same which can overcome the described limitations.

DETAILED DESCRIPTION

Figure 1:
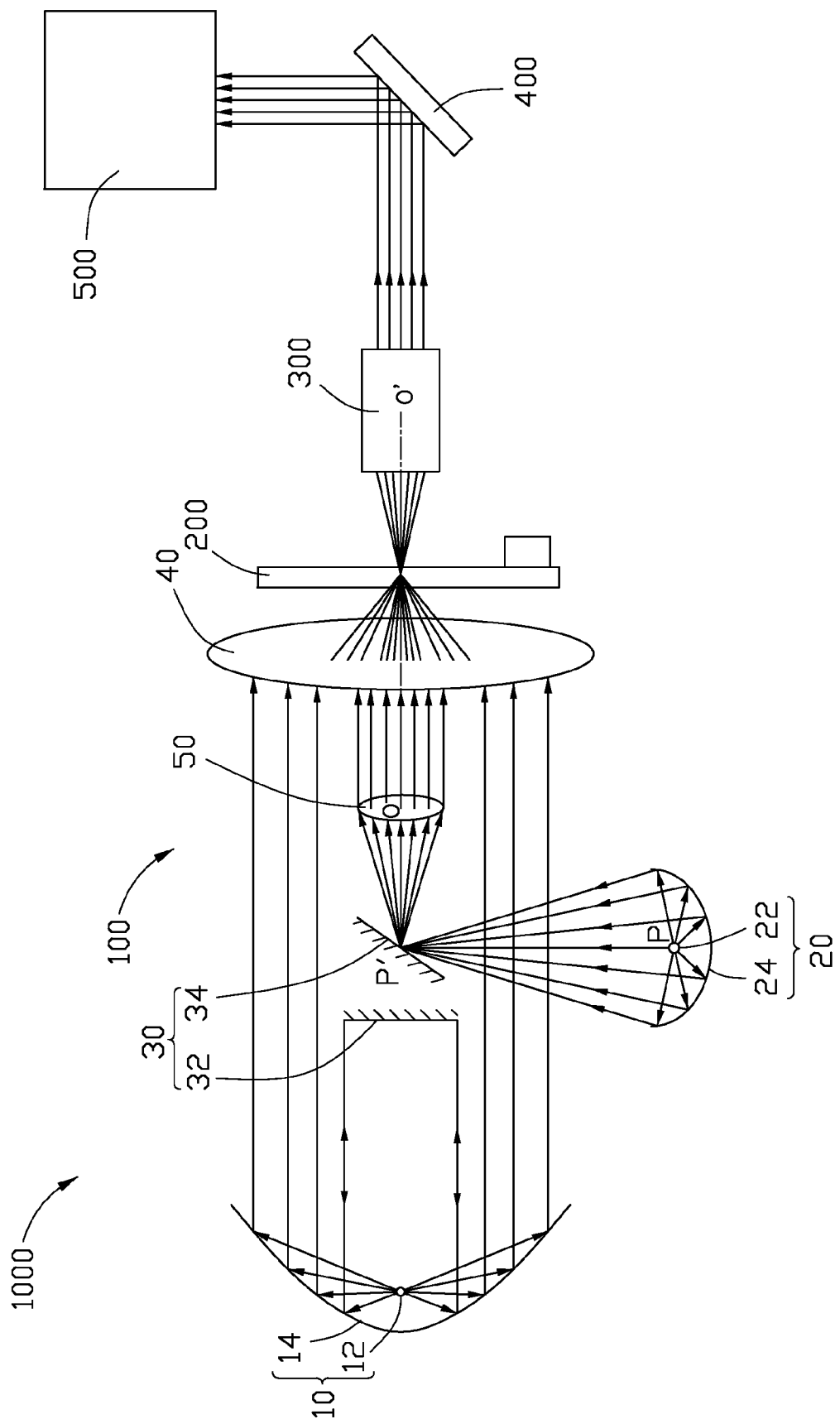
FIG. 1 is a schematic view of a projector, according to a first exemplary embodiment.

Referring to FIG. 1, a projector 1000, according to a first exemplary embodiment, includes a light source device 100, a color wheel 200, an integration rod 300, a digital micro-mirror device 400 (DMD), and a projection lens 500 along light path of light emitted from the light source device 100 in that order.

The light source device 100 includes a first light source 10, a second light source 20, a reflective assembly 30, a condensing lens 40 defining an optical axis OO', and a convex lens 50. The first light source 10, the reflective assembly 30, the convex lens 50, and the condensing lens 40 are arranged in order along the optical axis OO'. The second light source 20 corresponds to the reflective assembly 30 and is deviated from the optical axis OO'.

The first light source 10 includes a first lamp 12 and a first reflector 14. The first lamp 12, such as a high pressure mercury lamp, a metal halide lamp, or a xenon lamp, is configured for generating white light beams. The first reflector 14 is parabola-shaped in this embodiment. The first lamp 12 is positioned on one focus point of the first reflector 14. The first reflector 14 reflects the light beams generated by the first lamp 12 and light beams reflected by the reflective assembly 30 as first parallel light beams to the condensing lens 40.

The second light source 20 includes a second lamp 22 and a second reflector 24. The second lamp 22, such as a high pressure mercury lamp, a metal halide lamp, or a xenon lamp, is configured for generating white light beams. The second reflector 24 is ellipsoid-shaped in this embodiment. The second lamp 22 is positioned on one focus point P of the second reflector 24. The second reflector 24 reflects the light beams generated by the second lamp 22 as first condensed light beams to the reflective assembly 30.

The reflective assembly 30 includes a first mirror 32 and a second mirror 34. The first mirror 32 is positioned perpendicular to the optical axis OO', and is configured for reflecting the light beams reflected by the first reflector 14 back to the first reflector 14. The second mirror 34 is positioned in such manner that another focus point P' of the second reflector 24 is on a reflective surface of the second mirror 34. The second mirror 34 is configured for reflecting the first condensed light beams to the convex lens 50.

The convex lens 50 is positioned between the second mirror 34 and the condensing lens 40. A focus point of the convex lens 50 is on the reflective surface of the second mirror 34 with a location same as that of the another focus point P' of the second reflector 24. The convex lens 50 is configured for defocusing the light beams reflected by the second mirror 34 as second parallel light beams to the condensing lens 40. The condensing lens 40 is configured for condensing the first parallel light beams and the second parallel light beams as second condensed light beams.

The color wheel 200 receives the first and second condensed light beams and is configured for dispersing the first and second condensed light beams impinging thereon into three colored light beams, such as red (R), green (G), and blue (B) light beams.

The integration rod 300 is configured for receiving the colored light beams from the color wheel 200 and configured for rendering the light beams uniform. The DMD 400 is configured for modulating the light beams from the integration rod 300 into visual images. The projection lens 500 is configured for enlarging the visual images and presenting them on a viewing surface such as a screen (not shown).

When the projector 1000 works, the first light source 10 and the second light source 20 cooperatively provide the white light beams to produce visual images. Therefore, the brightness of the visual images becomes higher.

Figure 2:
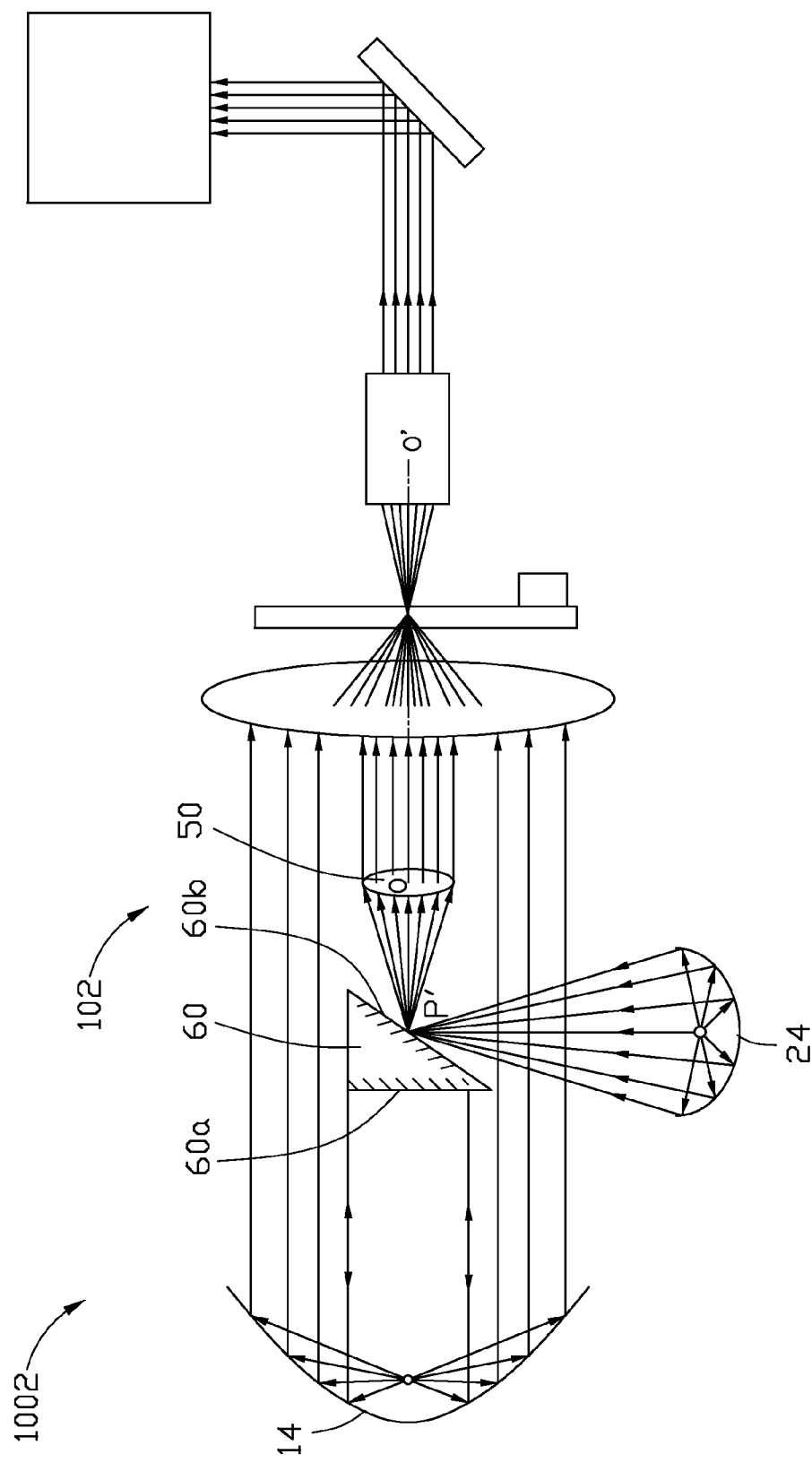
FIG. 2 is a schematic view of a projector, according to a second exemplary embodiment.

Referring to FIG. 2 together with FIG. 1, a projector 1002 according to a second embodiment is shown. The difference between the projector 1002 of this embodiment and the projector 1000 of the first embodiment is that a reflective assembly 60 of the light source device 102 is different.

The reflective assembly 60 is a right-angled triangular prism, and includes a right-angled reflective surface 60a perpendicular to the optical axis OO' and an inclined reflective surface 60b positioned angled relative to the optical axis OO'. The right-angled reflective surface 60a and the inclined reflective surface 60b are each coated with a reflective film. The right-angled reflective surface 60a is configured for reflecting the light beams reflected by the first reflector 14 back to the first reflector 14. The inclined reflective surface 60b is positioned in such manner that another focus point P' of the second reflector 24 is on the inclined reflective surface 60b. The inclined reflective surface 60b is configured for reflecting the first condensed light beams to the convex lens 50.

Figure 3:
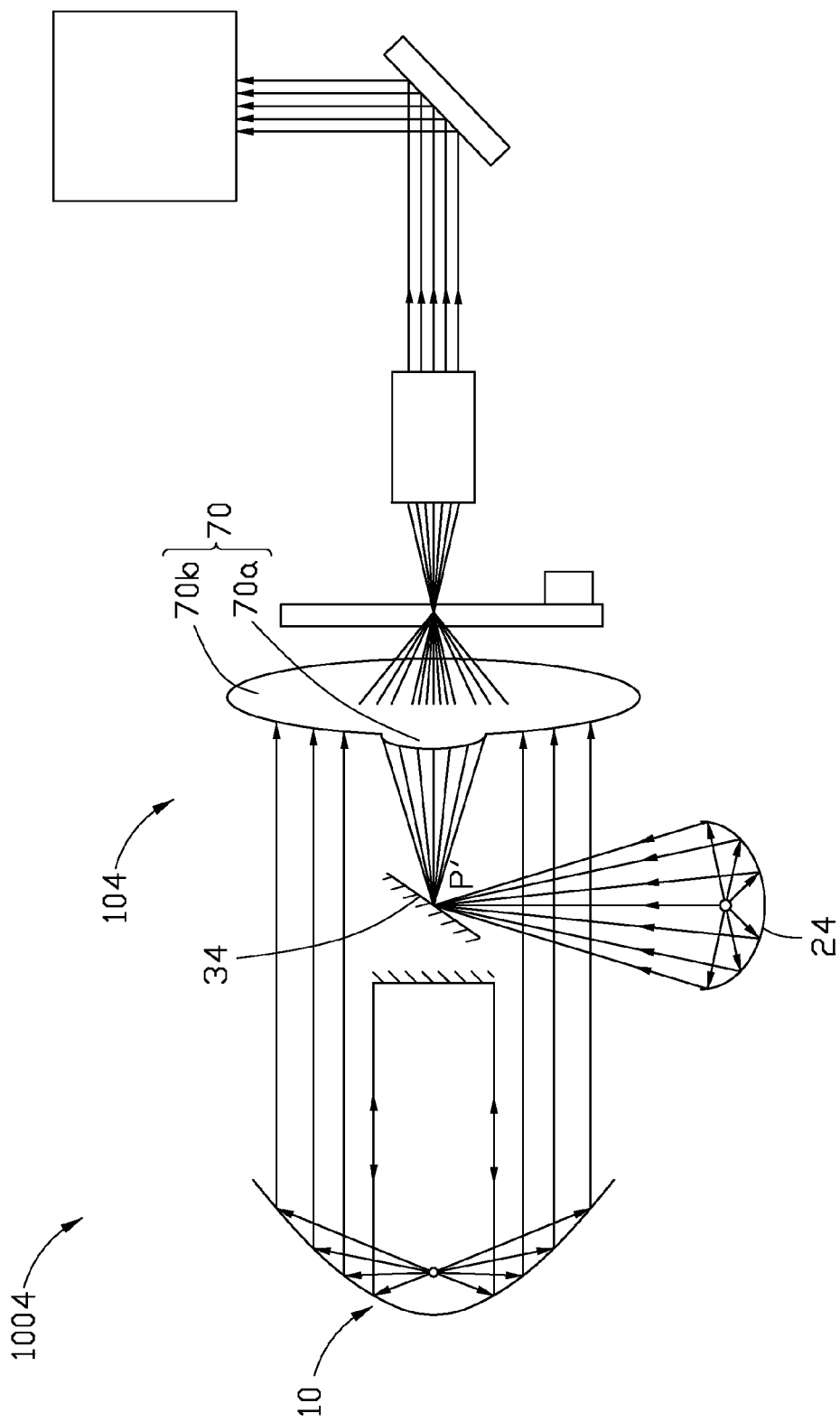
FIG. 3 is a schematic view of a projector, according to a third exemplary embodiment.

Referring to FIG. 3 together with FIG. 1, a projector 1004 according to a third embodiment is shown. The differences between the projector 1004 of this embodiment and the projector 1000 of the first embodiment are that the convex lens is omitted and the condensing lens 70 is different. The condensing lens 70 includes a center part 70a and a peripheral part 70b around the center part 70a. The radius of curvature of the peripheral part 70b is greater than that of the center part 70a. A focus point of the center part 70a is on the second mirror 34 with a location same as that of the another focus point P' of the second reflector 24. The center part 70a is configured for condensing the light beams from the second reflector 34. The peripheral part 70b is configured for condensing the first parallel light beams from the first light source 10.

Figure 4:
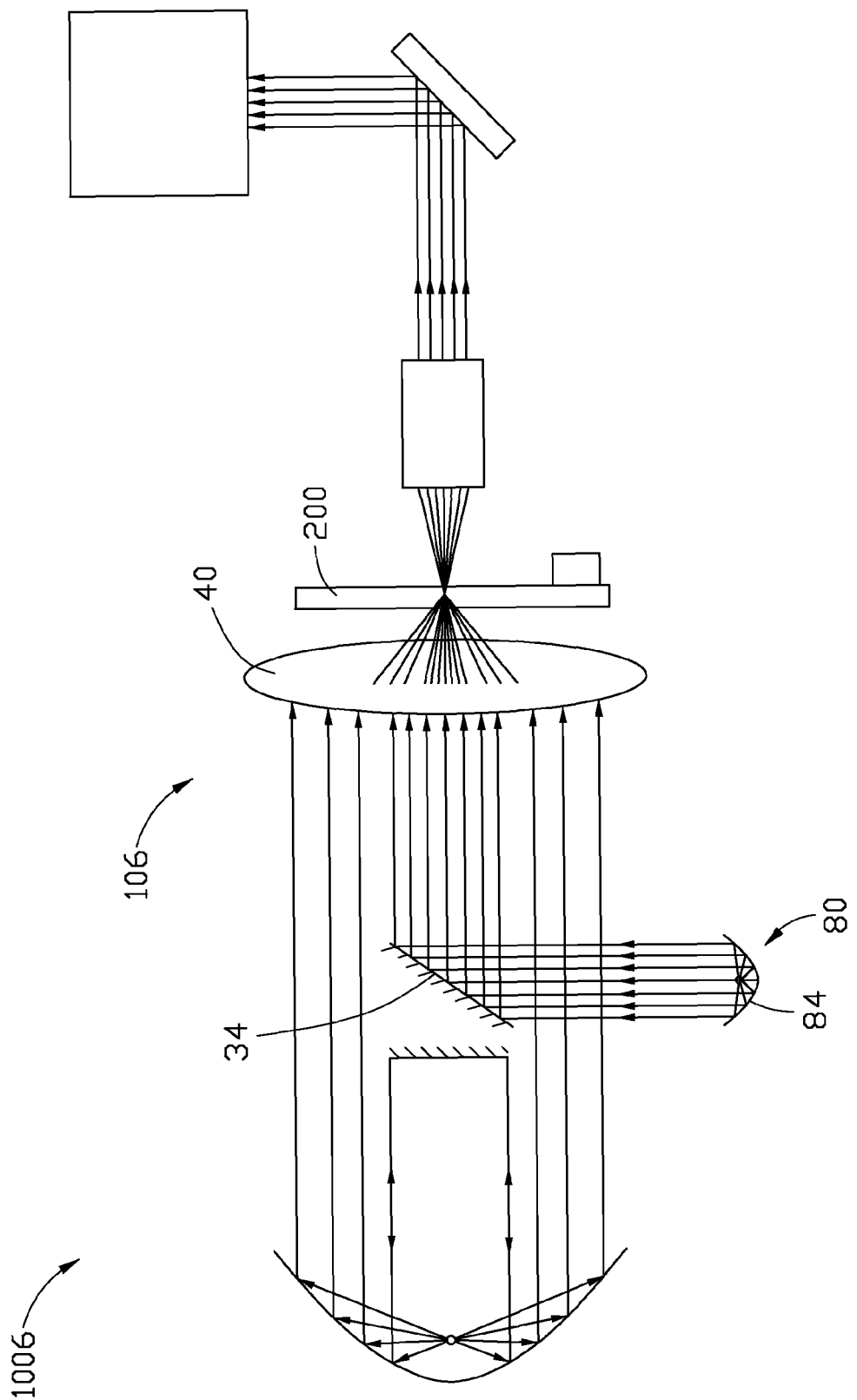
FIG. 4 is a schematic view of a projector, according to a fourth exemplary embodiment.

Referring to FIG. 4 together with FIG. 1, a projector 1006 according to a fourth embodiment is shown. The differences between the projector 1006 of this embodiment and the projector 1000 of the first embodiment are that the convex lens is omitted and the second reflector 84 is parabola-shaped. Therefore, the light beams reflected by the second reflector 84 are parallel towards the second mirror 34. The parallel light beams from the light source 80 are reflected by the second mirror 34 towards the condensing lens 40 and then are focused by the condensing lens 40 to the color wheel 200.

Advantages of the second to fourth embodiments are similar to those of the first embodiment. Further, the projectors 1006 and 1008 omit the convex lens. Therefore, manufacturing cost of the projector 1006 is reduced.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A light source device comprising:
   a first light source comprising a first lamp and a first reflector reflecting light beams generated by the first lamp as first parallel light beams;
   a second light source comprising a second lamp and a second reflector;
   a reflective assembly; and
   a condensing lens defining an optical axis;
   wherein the first light source, the reflective assembly and the condensing lens are arranged in order along the optical axis; the second light source corresponds to the reflective assembly and is deviated from the optical axis, the second reflector reflects light beams generated by the second lamp to the reflective assembly; the reflective assembly is configured for reflecting light beams reflected by the first reflector back to the first reflector, and is configured for reflecting light beams from the second reflector to the condensing lens; the condensing lens is configured for condensing the first parallel light beams and the light beams reflected by the reflective assembly from the second light source.

2. The light source device as claimed in claim 1, wherein the first reflector is parabola-shaped, and the first lamp is positioned on one focus point of the first reflector.

3. The light source device as claimed in claim 1, wherein the reflective assembly comprises a first mirror and a second mirror, wherein the first mirror is positioned perpendicular to the optical axis, and is configured for reflecting the light beams reflected by the first reflector back to the first reflector, the second mirror corresponds to the second light source, and the second mirror is configured for reflecting light beams from the second light source.

4. The light source device as claimed in claim 3, further comprising a convex lens disposed between the second mirror and the condensing lens, wherein the second reflector is ellipsoid-shaped and condenses the light beams generated by the second lamp as first condensed light beams, the second mirror is configured for reflecting the first condensed light beams to the convex lens, the convex lens is configured for defocusing the light beams reflected by the second mirror as second parallel light beams to the condensing lens.

5. The light source device as claimed in claim 4, wherein the second lamp is positioned on one focus point of the second reflector, the second mirror being positioned in such manner that another focus point of the second reflector is on the reflective surface of the second mirror, a focus point of the convex lens is on the reflective surface of the second mirror with a location same as that of the another focus point of the second reflector.

6. The light source device as claimed in claim 3, wherein the second reflector is ellipsoid-shaped and condenses the light beams generated by the second lamp as first condensed light beams to the second mirror, the condensing lens comprises a center part and a peripheral part around the center part, the curvature radius of the peripheral part is greater than that of the center part, the center part is configured for condensing light beams reflected by the second reflector, the peripheral part is configured for condensing the first parallel light beams.

7. The light source device as claimed in claim 6, wherein the second lamp is positioned on one focus point of the second reflector, the second mirror is positioned in such manner that another focus point of the second reflector is on the reflective surface of the second mirror, a focus point of the center part is on the second mirror with a location same as that of the another focus point of the second reflector.

8. The light source device as claimed in claim 3, wherein the second reflector is parabola-shaped, and is configured for reflecting light beams generated by the second lamp as second parallel light beams to the condensing lens, the condensing lens condenses the first parallel light beams and the second parallel light beams.

9. The light source device as claimed in claim 8, wherein the second lamp is positioned on one focus point of the second reflector.

10. The light source device as claimed in claim 1, wherein the reflective assembly is a right-angled triangular prism, and comprises a right-angled reflective surface perpendicular to the optical axis and an inclined reflective surface defined angled relative to the optical axis, the right-angled reflective surface and the inclined reflective surface are coated with a reflective film, respectively, the right-angled reflective surface is configured for reflecting the light beams reflected by the first reflector back to the first reflector, the inclined reflective surface is configured for reflecting the light beams from the second light source to the condensing lens.

11. A projector comprising:
   a light source device comprising:
      a first light source comprising a first lamp and a first reflector reflecting light beams generated by the first lamp as first parallel light beams;
      a second light source comprising a second lamp and a second reflector;
      a reflective assembly; and
      a condensing lens defining an optical axis;
      the first light source, the reflective assembly and the condensing lens are arranged in order along the optical axis; the second light source corresponds to the reflective assembly and is deviated from the optical axis, the second reflector reflects light beams generated by the second lamp to the reflective assembly; the reflective assembly is configured for reflecting light beams reflected by the first reflector back to the first reflector, and is configured for reflecting light beams from the second reflector to the condensing lens; the condensing lens is configured for condensing the first parallel light beams and the light beams reflected by the reflective assembly from the second light source, a color wheel, positioned in a light path of the light beams from the light source device, being configured for dispersing light beams from the condensing lens impinging thereon into three colored lights;

an integration rod configured for receiving the color light beams from the color wheel and configured for rendering the light beams uniform;

a digital micro-mirror device configured for modulating the light beams from the integration rod into visual images; and a projection lens configured for enlarging the visual images and presenting them on a screen.

12. The projector as claimed in claim 11, wherein the first reflector is parabola-shaped, and the first lamp is positioned on one focus point of the first reflector.

13. The projector as claimed in claim 11, wherein the reflective assembly comprises a first mirror and a second mirror, wherein the first mirror is positioned perpendicular to the optical axis, and is configured for reflecting the light beams reflected by the first reflector back to the first reflector, the second mirror corresponds to the second light source, and the second mirror is configured for reflecting light beams from the second light source.

14. The projector as claimed in claim 13, the light source device further comprising a convex lens disposed between the second mirror and the condensing lens, wherein the second reflector is ellipsoid-shaped and condenses the light beams generated by the second lamp as first condensed light beams, the second mirror is configured for reflecting the first condensed light beams to the convex lens, the convex lens is configured for defocusing the light beams reflected by the second mirror as second parallel light beams to the condensing lens.

15. The projector as claimed in claim 14, wherein the second lamp is positioned on one focus point of the second reflector, the second mirror being positioned in such manner that another focus point of the second reflector is on the reflective surface of the second mirror, a focus point of the convex lens is on the reflective surface of the second mirror with a location same as that of the another focus point of the second reflector.

16. The projector as claimed in claim 13, wherein the second reflector is ellipsoid-shaped and condenses the light beams generated by the second lamp as first condensed light beams to the second mirror, the condensing lens comprises a center part and a peripheral part around the center part, the curvature radius of the peripheral part is greater than that of the center part, the center part is configured for condensing light beams reflected by the second reflector, the peripheral part is configured for condensing the first parallel light beams.

17. The projector as claimed in claim 16, wherein the second lamp is positioned on one focus point of the second reflector, the second mirror is positioned in such manner that another focus point of the second reflector is on the reflective surface of the second mirror, a focus point of the center part is on the second mirror with a location same as that of the another focus point of the second reflector.

18. The projector as claimed in claim 13, wherein the second reflector is parabola-shaped, and is configured for reflecting light beams generated by the second lamp as second parallel light beams to the condensing lens, the condensing lens condenses the first parallel light beams and the second parallel light beams.

19. The projector as claimed in claim 18, wherein the second lamp is positioned on one focus point of the second reflector.

20. The projector as claimed in claim 13, wherein the reflective assembly is a right-angled triangular prism, and comprises a right-angled reflective surface perpendicular to the optical axis and an inclined reflective surface defined angled relative to the optical axis, the right-angled reflective surface and the inclined reflective surface are coated with a reflective film respectively, the right-angled reflective surface are configured for reflecting the light beams reflected by the first reflector back to the first reflector, the inclined reflective surface is configured for reflecting the light beams from the second light source to the condensing lens.

* * * * *